US012577049B2

(12) United States Patent
Kanellos et al.

(10) Patent No.: US 12,577,049 B2
(45) Date of Patent: Mar. 17, 2026

(54) SYSTEM OF HANDLING CONTAINERS

(71) Applicant: Ocado Innovation Limited, Hatfield (GB)

(72) Inventors: Ioannis Kanellos, Piraeus (GR); Orestis Fainekos, Athens (GR)

(73) Assignee: Ocado Innovation Limited, Hatfield (GB)

( * ) Notice: Subject to any disclaimer, the term of this patent is extended or adjusted under 35 U.S.C. 154(b) by 447 days.

(21) Appl. No.: 18/259,901

(22) PCT Filed: Dec. 26, 2021

(86) PCT No.: PCT/EP2021/087662
§ 371 (c)(1),
(2) Date: Jun. 29, 2023

(87) PCT Pub. No.: WO2022/144330
PCT Pub. Date: Jul. 7, 2022

(65) Prior Publication Data
US 2024/0067451 A1 Feb. 29, 2024

(30) Foreign Application Priority Data

Dec. 31, 2020 (EP) .................................... 20217951

(51) Int. Cl.
*B65G 1/137* (2006.01)
*B65G 1/04* (2006.01)
(Continued)

(52) U.S. Cl.
CPC ......... *B65G 1/1375* (2013.01); *B65G 1/0492* (2013.01); *B65G 1/06* (2013.01);
(Continued)

(58) Field of Classification Search
CPC ...... B65G 1/1375; B65G 1/0492; B65G 1/06; B65G 1/065; B65G 1/10; B65G 1/1378;
(Continued)

(56) References Cited

U.S. PATENT DOCUMENTS 4,678,390 A 7/1987 Bonneton et al.
9,378,482 B1 * 6/2016 Pikler .................. G05D 1/0297
(Continued)

FOREIGN PATENT DOCUMENTS

DE 202018101774 U1 4/2019
EP 0235488 A1 9/1987
(Continued)

OTHER PUBLICATIONS

International Search Report (PCT/ISA/210) and Written Opinion (PCT/ISA/237) mailed on Oct. 25, 2022, by the European Patent Office as the International Searching Authority for International Application No. PCT/EP2021/087662.
(Continued)

*Primary Examiner* — Thomas Randazzo
(74) *Attorney, Agent, or Firm* — Gregory Matt McCloskey

(57) ABSTRACT

System for handling containers and a method for supplying inventory items to a fulfilment station in a warehouse or in any other location where fulfilment of orders or delivery of orders, for example grocery orders, is taking place. The system includes at least one mobile inventory carrier for storing containers, a mini load system including a gripping mechanism for picking up or releasing a container from the mobile inventory carrier and autonomous mobile robotic units, wherein the mini load system, the mobile inventory carrier and the autonomous mobile robotic unit(s) are distinct units and operate independently from each other.

20 Claims, 14 Drawing Sheets

(51) Int. Cl.

| | |
|---|---|
| *B65G 1/06* | (2006.01) |
| *B65G 1/10* | (2006.01) |
| *B66F 9/06* | (2006.01) |
| *B66F 9/075* | (2006.01) |
| *G05B 19/418* | (2006.01) |
| *G06Q 10/087* | (2023.01) |

(52) U.S. Cl.

CPC .............. *B65G 1/065* (2013.01); *B65G 1/10* (2013.01); *B65G 1/1378* (2013.01); *B66F 9/063* (2013.01); *B66F 9/0755* (2013.01); *G05B 19/41895* (2013.01); *G06Q 10/087* (2013.01); *B65G 2201/0235* (2013.01); *B65G 2203/041* (2013.01)

(58) Field of Classification Search

CPC ...... B65G 2201/0235; B65G 2203/041; B66F 9/063; B66F 9/0755; G05B 19/41895; G06Q 10/087

See application file for complete search history.

(56) References Cited

U.S. PATENT DOCUMENTS

| | | | |
|---|---|---|---|
| 9,457,468 B1 | 10/2016 | Elazary et al. | |
| 9,663,292 B1 * | 5/2017 | Brazeau ............... | G05D 1/0297 |
| 10,029,851 B1 | 7/2018 | Durham et al. | |
| 2014/0214234 A1 * | 7/2014 | Worsley ............. | G05B 19/4189 |
| | | | 701/2 |

| | | | |
|---|---|---|---|
| 2016/0229631 A1 * | 8/2016 | Kimura ............... | B65G 1/1378 |
| 2017/0330142 A1 | 11/2017 | Kanellos et al. | |
| 2017/0330269 A1 | 11/2017 | Kanellos et al. | |
| 2018/0215539 A1 * | 8/2018 | Kimura ................. | B65G 1/026 |
| 2019/0329978 A1 | 10/2019 | Li et al. | |
| 2021/0110339 A1 | 4/2021 | Kanellos et al. | |

FOREIGN PATENT DOCUMENTS

| | | | |
|---|---|---|---|
| EP | 0458722 | A1 | 11/1991 |
| WO | 2017121747 | A1 | 7/2017 |
| WO | 2017197285 | A1 | 11/2017 |
| WO | 2018234155 | A1 | 12/2018 |
| WO | 2019083199 | A1 | 5/2019 |

OTHER PUBLICATIONS

Search Report dated Jun. 10, 2021, by the European Patent Office for Application No. 20217951.1.

Office Action issued on Dec. 4, 2024, by the Canadian Patent Office in corresponding Canadian Patent Application No. 3,206,853. (5 pages).

First Office Action issued on Oct. 1, 2024, by the Japanese Patent Office in corresponding Japanese Patent Application No. 2023-540093, and an English Translation of the Office Action. (5 pages).

Office Action (Examination Report No. 1) issued on Sep. 24, 2024, by the Australian Patent Office in corresponding Australian Patent Application No. 2021415127. (3 pages).

* cited by examiner

102

102a

102

102a

104

104

111

104c 1 0 7
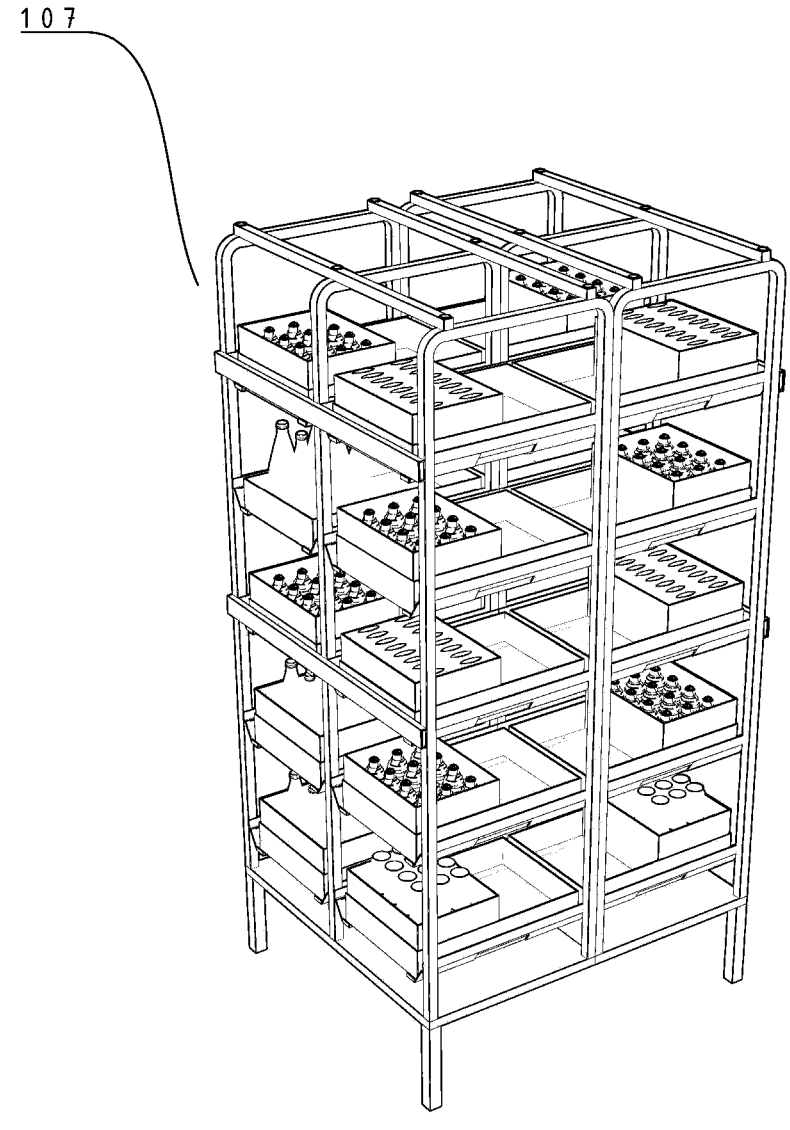
F i g . 1 1

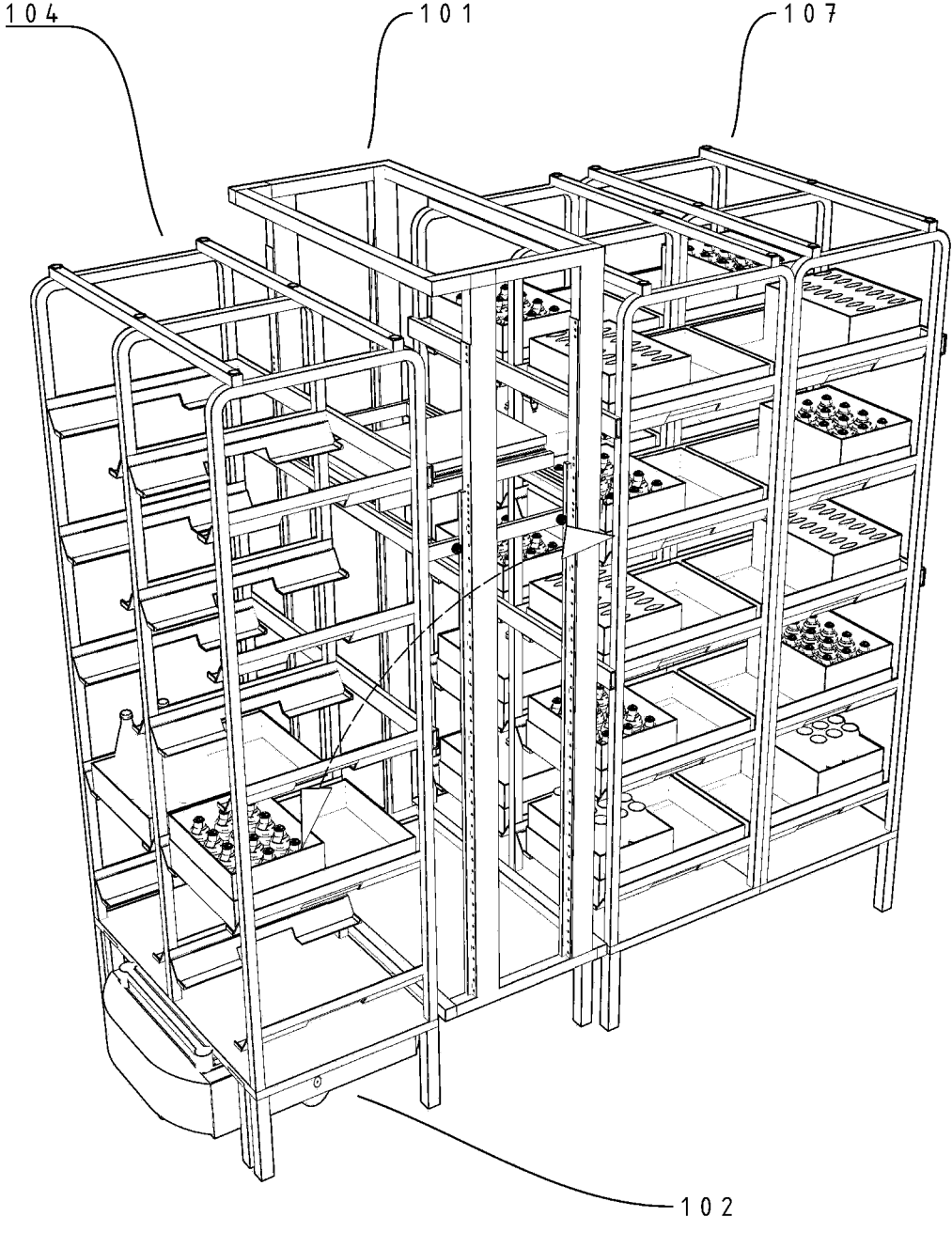
F i g . 1 2

SYSTEM OF HANDLING CONTAINERS

CROSS REFERENCE TO RELATED APPLICATIONS

This application claims priority from European patent application No. 20217951.1, filed on Dec. 31, 2020, the contents of which are hereby incorporated herein in their entirety by this reference.

TECHNICAL FIELD

The present disclosure relates to a system for handling containers, a method of supplying inventory and the use of the system thereof.

BACKGROUND

During the last 20 years the breathtaking increase of e-commerce, boosted by the exponential proliferation of the internet and the use of smart phones, inflicted deep changes on the way products are transferred from the retail operators to the end customers.

For many decades this was done in the traditional way, where pallets of goods were transferred from the production sites or the wholesalers to the retailers' warehouses. From there on the goods were forwarded to the stores, usually in the form of mixed pallets (i.e. pallets built from boxes, each box containing a unique Stock Keeping Unit—SKU). At the store the pallets were dismantled, and the boxes were put away into the store's warehouse. Finally, the products were put on the store shelves from where the customers were picking them up.

The abrupt emergence of e-commerce has disrupted this decades-old model of product distribution and it is now the retailer that must accomplish the item picking and packing to finally deliver the ordered items to the customer.

These dramatic changes in the distribution model have imposed huge increases in the picking and packing costs, as the effort in item picking is by far higher than that of pallet or box picking. Also, the handling of boxes and containers in the warehouses is more frequent and complex. Since the customers are very reluctant to pay higher prices when purchasing the goods online, these costs usually burden the retailers.

This problem becomes even bigger for the grocery e-commerce, which is the biggest part of the retail market (40% to 50% of the total retail market), as:

the average number of items per online order is much higher than the rest of the retail sectors (around 50 items per average online order).

there is the additional need to maintain multi-temperature zones for the perishable items.

finally, the grocery industry operates on razor-thin margins (usually <2%), which makes it very difficult for this industry to absorb the cost of needed investments in infrastructure to reduce the pick, pack and ship costs and permit the online grocery to enjoy positive bottom lines.

All above difficulties have been the drives for the immergence of innovative material handling systems based on autonomous robotic vehicles that are also equipped with container handling systems. These composite machines are able to freely roving in the corridors of a warehouse, fetching containers with products from the shelves, temporarily store them on their onboard storage racks and transfer them in a designated point in the warehouse for further process (WO2017/121747, WO2018/234155) while other systems as described for example in US201514719196 are proposing a similar system but able to carry one container at a time.

A basic drawback of these conventional systems is that the robotic machines they propose, can interact (fetch or store) with containers that are directly accessible from a store) with containers that are directly accessible from a corridor in front of a shelf. This has the drawback that a large area of the warehouse should be used as corridors, thus reducing the area that could be used for shelving/storing the containers.

Another drawback of these conventional systems is the fact that the autonomous mobile robot (AMR) unit as well as the container handling system are bolded firmly on the same platform and as long as one of those parts is involved in a process the other part remains inactive, which limits the utilization time of each part. For example, when the battery of the autonomous mobile robot needs to stay connected at a battery recharging station, at the same time the container handling system remains inactive. In other examples, when the system needs to park at a fulfilment station and feed the operator with inventory donor containers, for as long as this task is performed the autonomous mobile robot of the machine remains at the station unable to perform. Furthermore, if either part fails then the other is put out of order as well, which constitutes a single-point-of-failure system.

Other systems, as described for example in EP0235488 and EP0458722, are teaching an even more inflexible robotic machine, in the sense that all of its parts, i.e. autonomous mobile robot, container handling system and storage rack, are firmly bonded on the same platform.

US2017330269A1 discloses a method for managing inventory carriers using mobile robotic units (MRUs) in a pod that is configured to receive online orders at a replenishment station for pickup by customers at a delivery station. Such method includes receiving, by a mobile robotic unit, instructions that identify a first inventory carrier, moving the mobile robotic unit to a location of the identified inventory carrier, and using the mobile robotic unit to transport the identified inventory carrier to the replenishment station for pickup by a delivery vehicle.

U.S. Ser. No. 10/029,851B1 describes an inventory system having multiple inventory holders and drive units for moving the inventory holders. The document discloses operations of inventory systems that use containers and/or other features to facilitate the division of inventory item processing between automated and manual options, such as between routing an inventory item to be extracted from a container by a human operator or routing an inventory item to be extracted from a container by a robotic manipulator.

WO2017197285A1 discloses a method for delivering online orders to customers via a fully unmanned system. Such method includes replenishing the pod by using inventory carriers carrying containers via a replenishment hatch, moving an inventory carrier attached to carrier base with a mobile robotic unit in a room of adequate temperature. Additionally, the method includes transferring an inventory carrier at a mini load station and loading the order containers on a delivery carrier. The method further includes transferring a delivery carrier and attaching it to a delivery hatch so that the customer, following authentication, is able to pull the drawers and pick the ordered items.

WO2019083199A1 describes a goods transfer system, which combines an autonomous combination picking and classification operation model using robots and an operation methodology. The goods transfer system of that document comprises at least one transport cart including a plurality of cells on which goods are loaded; and a picking robot capable of moving the goods loaded on the transport cart, wherein the picking robot receives information on goods allocated to the plurality of cells and relocates the goods or supplements shortage of goods.

There is the need for a fully automated system with one or more autonomous mobile robots which help carry out all needed processes to handle in an optimum manner the orders placed online by customers.

SUMMARY

The present disclosure resides in a system for handling containers and a method for supplying inventory items to a fulfilment station in a warehouse or in any other location where fulfilment of orders or delivery of orders, for example grocery orders, is taking place, and the use of the system thereof.

According to aspects of the disclosure, a system for handling containers is provided, that comprises at least one mobile inventory carrier for storing containers, a mini load system comprising a gripping mechanism for picking up or releasing a container from the at least one mobile inventory carrier, at least one autonomous mobile robotic unit, wherein the mini load system, the at least one mobile inventory carrier and the at least one autonomous mobile robotic unit are distinct units and operate independently from each other.

In other aspects of the disclosure, the at least one mobile inventory carrier is freely mounted in a workplace and the at least one autonomous mobile robot unit is configured to lift and/or rotate the mobile inventory carrier.

According to other aspects of the disclosure, the at least one autonomous mobile robotic unit is configured to transport the at least one mobile inventory carrier within a workplace.

In other aspects, the mini load system comprises a pedestal, the at least one mobile inventory carrier is attached on said pedestal and the at least one autonomous mobile robotic unit is configured to move together the mini load system and the at least one mobile inventory carrier within a workplace.

In other aspects, the mini load system comprises a gantry system comprising a gantry frame, a pair of gantry joints for moving on the Z and X axes, and a container handler (101*e*) capable for moving in the Y axes as well as to rotate on the XY plane.

In other aspects the, gripping mechanism of the mini load system comprises at least one camera and at least one lighting means configured to identify angular and/or linear deviations of the mobile inventory carrier 107 and thereby guide the movements of the pair of the gantry joints (101*c*, 101*d*) and of the container handler (101*e*). In other aspects, the at least one camera and the at least one lighting means are configured to generate a stream video.

In other aspects, the at least one mobile inventory carrier is being lifted by an autonomous mobile robotic unit and placed on the pedestal of a gantry type mini load. Then the autonomous mobile robotic unit is capable of propelling underneath, raise both the mini load and the at least one mobile inventory carrier and move them within a workplace.

In other aspects, the first pedestal comprises rails and one or more wheels coupled to that rails.

In other aspects of the disclosure, the autonomous mobile robotic unit is wireless and comprises an integrated rechargeable battery.

In other aspects of the disclosure, the battery of the autonomous mobile robotic unit provides power to the mini load system.

According to other aspects of the disclosure, a method for supplying inventory items is provided to a fulfilment station comprising the steps of:

a) transportation of a first mobile inventory carrier with one or more filled donor containers by a first autonomous mobile robotic unit from an inventory area of a fulfilment center to an exchange point, b) loading of the one or more donor containers of the first mobile inventory carrier by a mini load to a second mobile inventory carrier that is placed on the pedestal of the mini load system (101), the second mobile inventory carrier being empty before loading, c) repeating steps, a and b until the second mobile inventory carrier is fully loaded with donor inventory containers, d) transporting of the loaded second mobile inventory carrier by an autonomous mobile robotic unit to a picking station of a fulfilment center, e) transferring of the second mobile inventory carrier onto the pedestal of a mini load serving a picking station, f) selection by the mini load gripper of a first donor container from the second mobile inventory carrier and delivery of the first donor container to an operator, g) selection by the operator of at least one item from the first donor container and place it into an order container, wherein steps f and g are repeated until the operator has selected items from all the donor containers and placed them into the designated order containers.

In other aspects of the disclosure, the method for supplying inventory items comprises the steps of an autonomous mobile robotic unit that arrives at the picking station of a fulfilment center, the second mobile inventory carrier is lifted by the autonomous mobile robotic unit from the mini load pedestal that is serving the picking station, the autonomous mobile robotic unit returns the second mobile inventory carrier to the inventory area of the fulfilment center and places it on a pedestal of another mini load system, In other aspects of the disclosure, the autonomous mobile robot goes to a charging station automatically to be recharged when it is not involved in a process or when its battery has been depleted at a critically low level.

In other embodiments, the use of a system for handling containers is provided, in a fulfilment center.

A first effect of having distinct units that operate independently of each other is that increased utilization of each and all components is achieved, as well as single-point-of-failure is avoided, since if any component of the system fails, it could be replaced by another similar component and operate smoothly with the other two components. Therefore, having a failed unit does not necessarily put out of order the other components of the system. Further, when an autonomous mobile robotic unit recharges its battery does not block the operation of a mini load for the time that the recharging is taking place.

In addition, when a mobile inventory carrier has to be transferred from a point A to a point B within the area of operation, it takes only an autonomous mobile robotic unit to carry out that operation. Meanwhile, the mini load system, can concurrently operate at another spot, for example at a picking station handling donor container, or working with another autonomous mobile robotic unit to perform one of the processes provided.

This freedom in operation of the main components of the system, namely the autonomous mobile robotic unit, the mini load and the mobile inventory carrier, results in increased utilization which results to lower resources demand for a given level of throughput.

On top of that, the mass parallel operation of the system greatly reduces temporary shutdowns due to machinery failure. Having continuous operation is advantageous since a temporary shutdown, which is the case of single-point-of-failure legacy systems, may cause significant delays to the delivery of the orders and may force to activate further human resources thus resulting in an overall cost increase and questionable quality of the system.

The term "container" as described herein the present disclosure should be interpreted by a person skilled in the art to comprise various options of subjects suitable to host inventory, which for example may be but not limited to a plain tray or a combination of a tray with a box or dekit bins.

It can be thus understood that the system of the present disclosure permits a much higher utilization rate for each and all of the particular components that the whole system comprises of, which results to lesser resources needed as compared with the machines proposed by the previously mentioned conventional systems.

Another effect that is achieved by the herein disclosed system for handling containers, is that the system effectively operates in a warehouse where inventory is stored in donor containers, which in turn are stored on inventory carriers capable of being moved, such mobile inventory carriers being attached on a pedestal that permits an autonomous mobile robot unit to propel underneath, raise it and turn it around or move it from a point A to a point B within the area of operations. In the state of the art systems (like for example on the WO2017/121747) the inventory carriers are fixedly attached, for example bolted, to the ground of the workplace and their grapping mechanism is able to fetch inventory that is directly accessible via the corridors of the workplace. This render those systems with the disadvantage of needing more space for like-for-like inventory storage.

Further, with the various unit of the system being distinct and detachable, the mobile inventory carriers are permitted to be stored in a much denser manner (for example back-to-back). This means that less storage area is needed compared to the storage area needed for conventional systems to store similar quantities of inventory, the reason being that the latter are only able to operate with containers that are accessible directly from the corridor, resulting to larger number of corridors needed when conventional systems are considered.

Further to these, when the autonomous mobile robotic units of the present disclosure have to move for example from a point A to a point B in a workplace, they can propel using paths via corridors or under the pedestals of the mobile inventory carriers as well. This results to less traffic jam on the corridors, which means a much more efficient path planning can be applied which eventually reduces the number of autonomous mobile robot units that are needed for like-for-like throughput compared with the conventional systems.

The herein disclosed system as claimed in the appended claims permits much denser layouts of inventory carriers, which eventually results in less space needed for like-for-like storage.

BRIEF DESCRIPTION OF THE DRAWINGS

The description above, as well as the detailed description that follows, will be better understood when read in conjunction with the figures shown. For purposes of illustration, the figures show specific embodiments of the present disclosure. However, it should be understood that the present disclosure is not limited to the particular embodiment and the features appearing. The accompanying drawings, which are included and form part of the description, illustrate the embodiment of a system according to the present description and, together with it, serve to illustrate advantages and principles in accordance with the present description.

FIG. 11 shows the perspective view of a mobile inventory carrier carrying donor containers with inventory items.

FIG. 12 shows a mini load with an attached mobile inventory carrier supported by an autonomous mobile robotic unit. The mini load is fetching donor containers from a mobile inventory carrier and storing them on its mobile inventory carrier storage slots.

DETAILED DESCRIPTION

The phrase and terminology used below are for the purpose of description and should not be construed as limiting. For example, using a single grade, such as "one" does not intend to determine the number of operations. Also, the use of local pronouns such as "up", "down", "left", "right", "back" etc. are used in the description for clarity purposes for certain elements of the figures and are not intended to limit the scope of the present description or the appended claims. In addition, it is to be understood that any of the features of the present disclosure may be used autonomously or in combination with other features. Other functionally equivalent systems, methods, features, uses and advantages of the present disclosure will be apparent to one skilled in the art after examining the drawings and description. All additional systems, methods, features, uses, and advantages are intended to be within the scope of the present disclosure and be protected from the scope of the accompanying claims.

Figure 1:
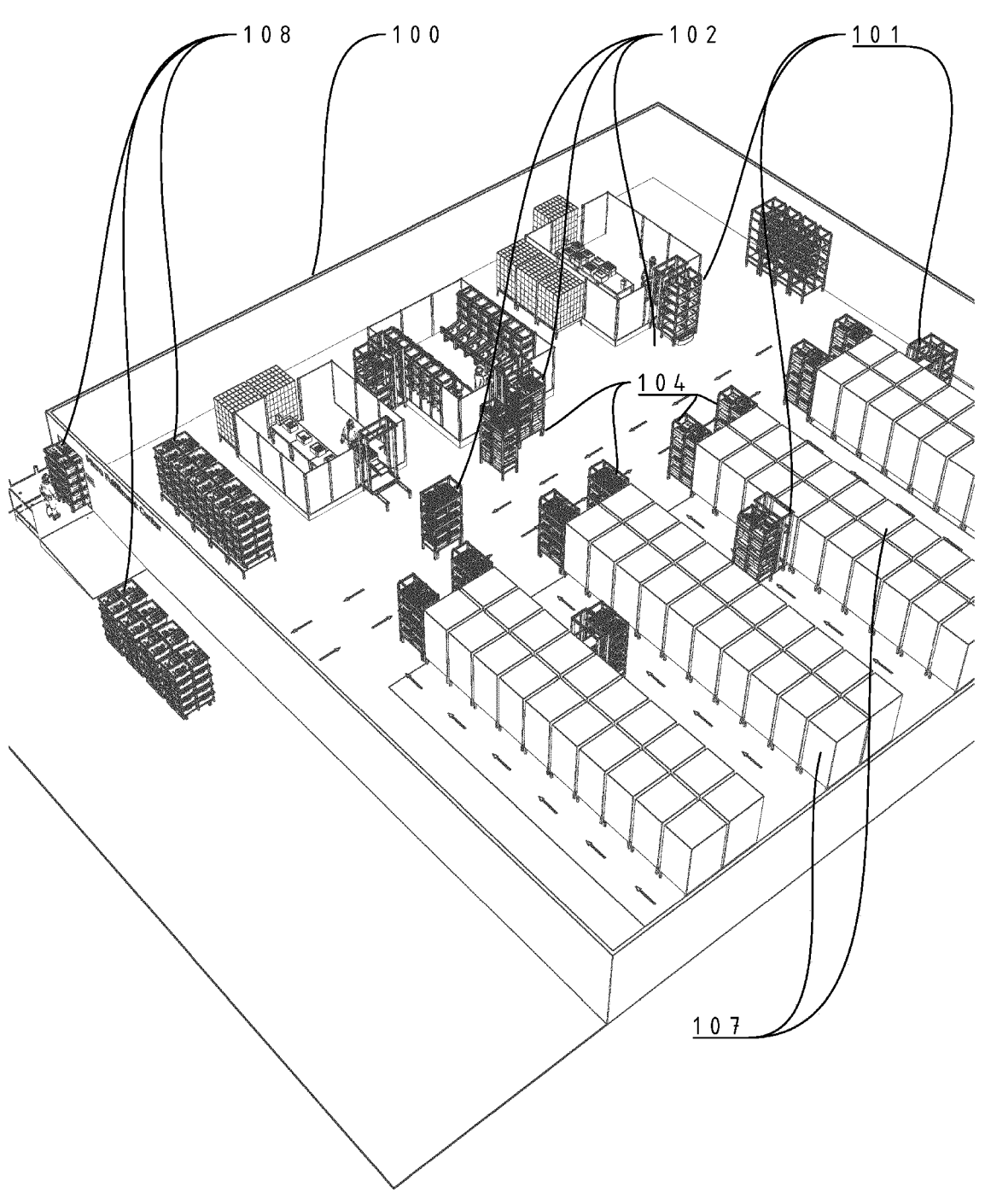
FIG. 1 is a perspective view of an example of a workplace that the system can operate, which is a micro fulfillment center for online orders or any other type of orders, for example orders to supply a convenience store or any other type of store with inventory items.

In FIG. 1 the system 100 for handling containers is shown. In detail, autonomous mobile robotic units 102, mobile inventory carriers 104, 107, mobile inventory carriers with wheels 108 and mini load systems 101 are shown.

Figure 5:
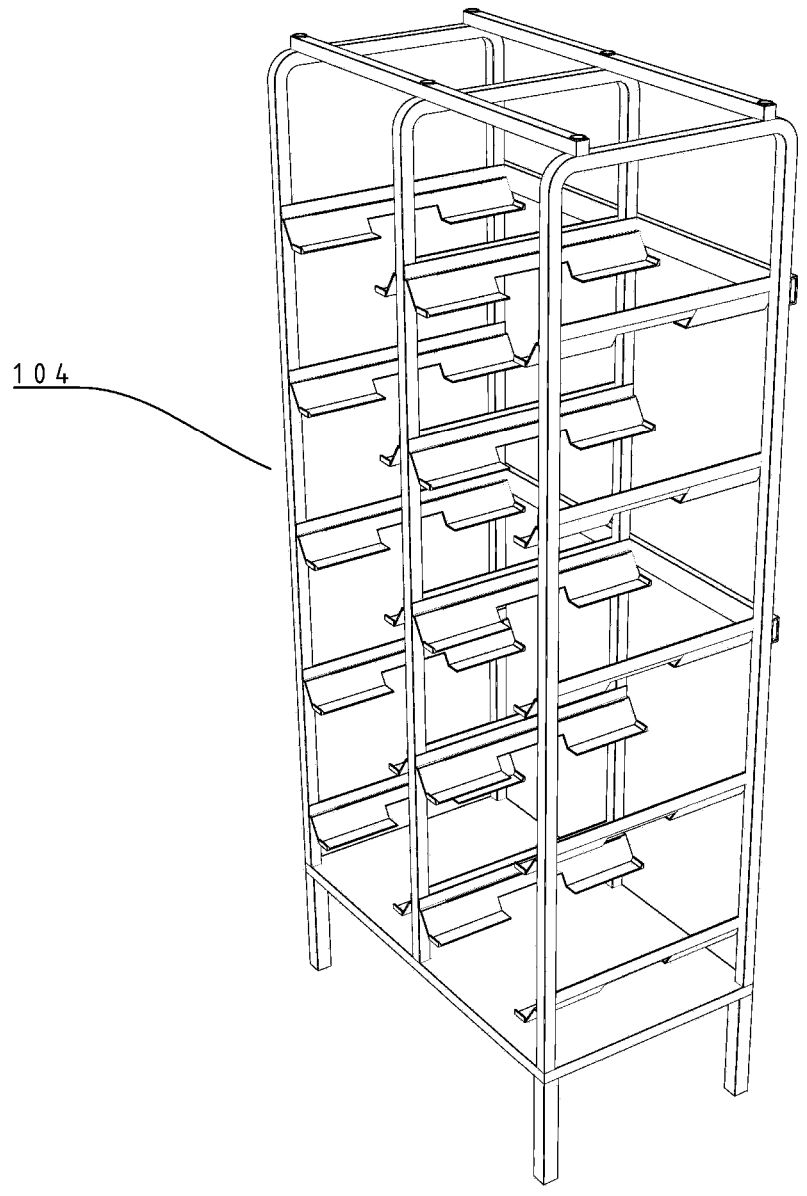
FIG. 5 is a perspective view of a mobile inventory carrier with no containers in its storage slots.
Figure 8:
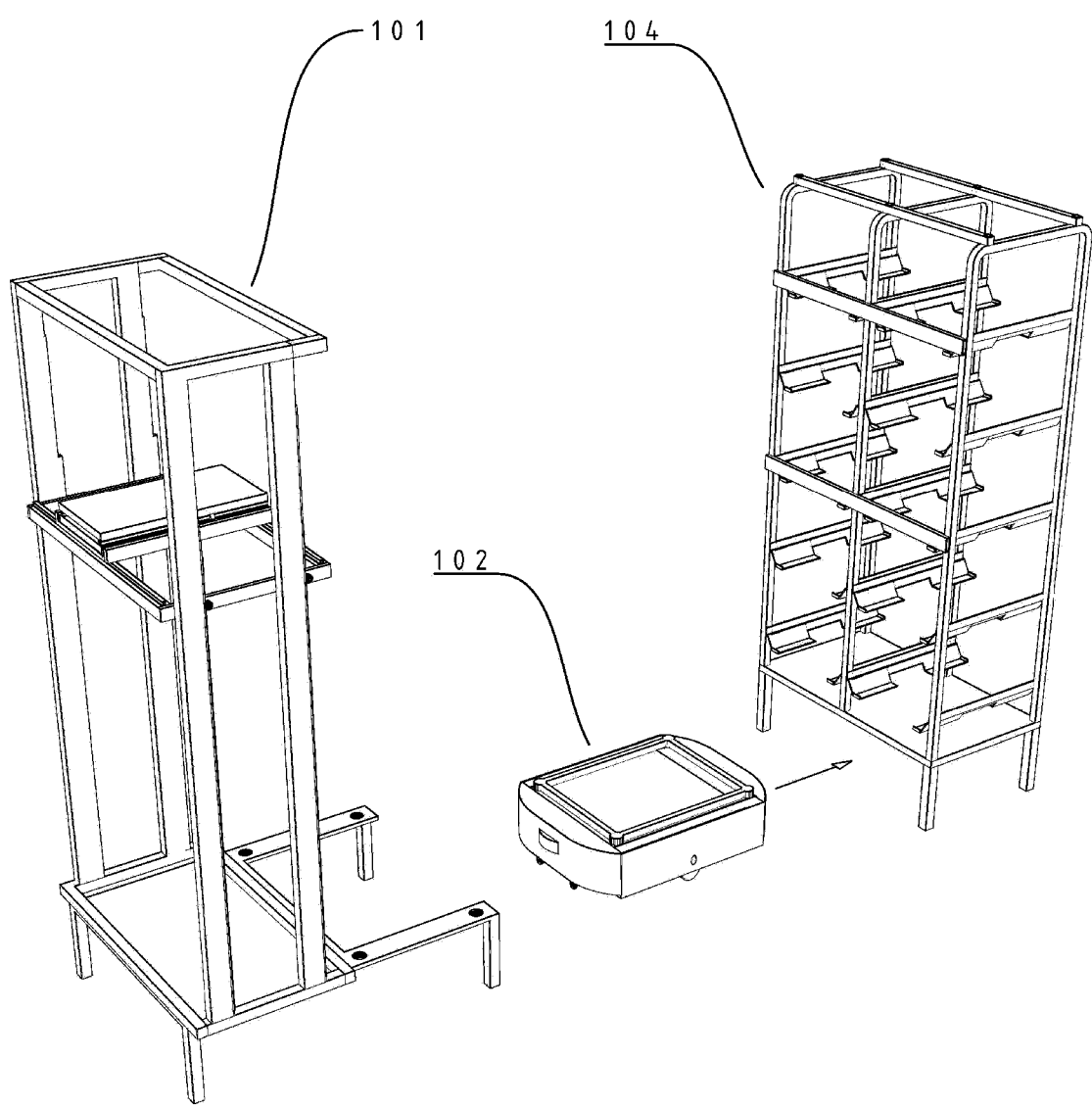
FIG. 8 is a perspective view of an autonomous mobile robot unit moving to go beneath a mobile inventory carrier.
Figure 9:
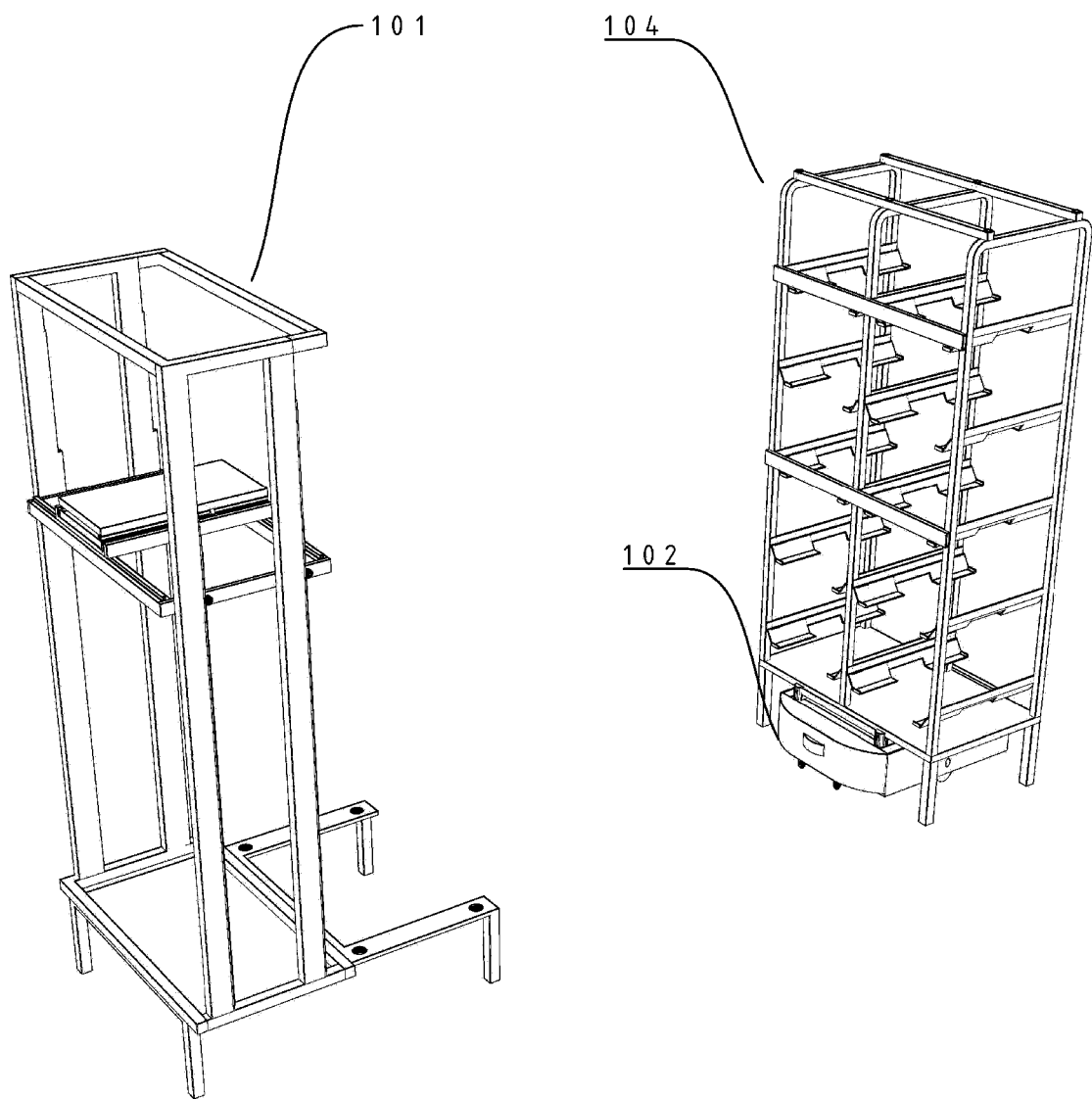
FIG. 9 is a perspective view of an autonomous mobile robotic unit that has moved beneath a mobile inventory carrier and lifted it up to move it and place it on the pedestal of a mini load.
Figure 10:
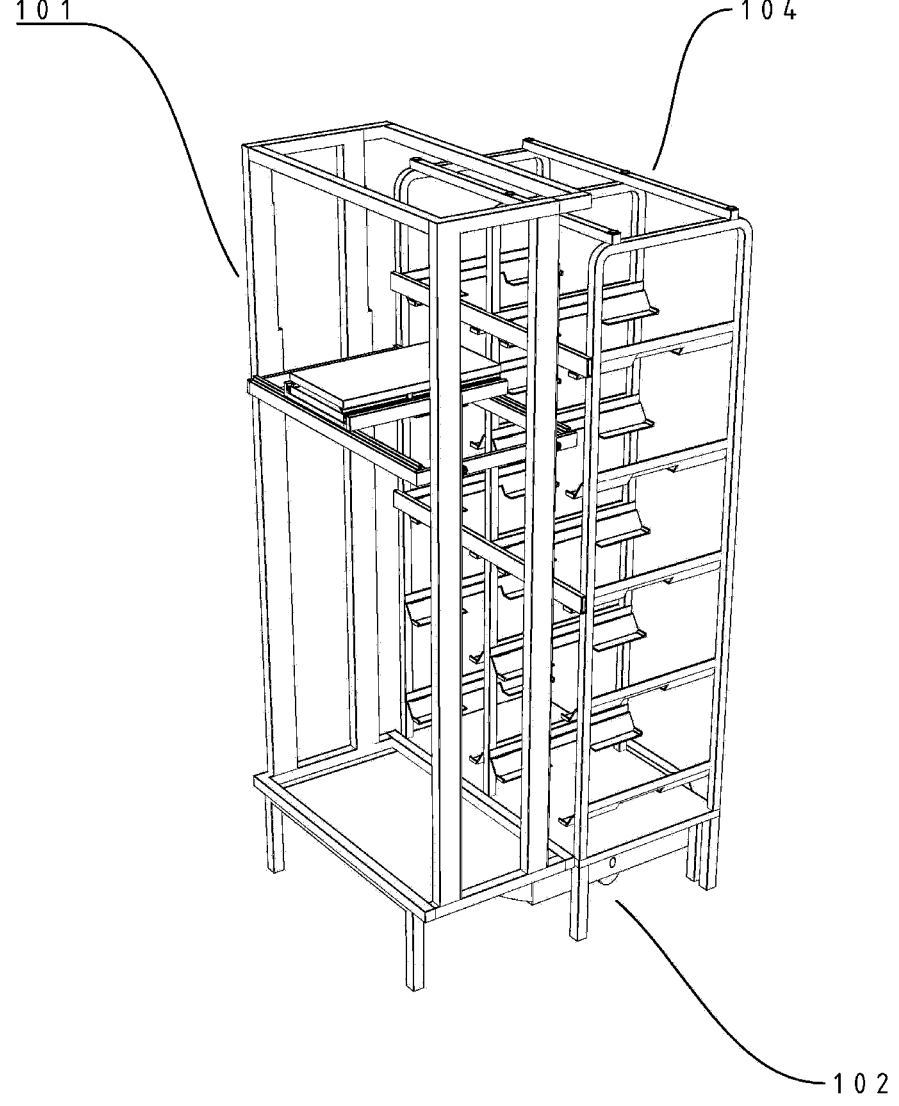
FIG. 10 is a perspective view of a, mini load system, an autonomous mobile robotic unit and a mobile inventory carrier placed on the pedestal of the mini load.

In examples, a mobile inventory carrier 104 is freely mounted within a workplace, as it can be seen also in FIG. 5. Freely mounted may be interpreted that the mobile inventory carrier is not bolted to the ground of a workplace and that is capable of being transported. So, the mobile inventory carrier can be lifted by an autonomous mobile robot unit 102, transferred, and placed on the pedestal of a mini load as shown in FIGS. 8, 9 and 10.

From that point forward the autonomous mobile robotic unit is able to lift both the mini load system 101 and the attached on its pedestal mobile inventory carrier 104 and move them from a point A to a point B within the workplace.

Apart from the increased utilization of each and all components that is this way achieved, increased flexibility and effectiveness of the system is also succeeded, since no component remains unused or idle, since, for example, an empty mobile inventory carrier may be transported by an autonomous mobile robotic unit to be filled again, thus avoiding any human involvement for transporting containers stored on mobile inventory carriers within the workplace.

Further, an autonomous mobile robot unit 102 with its lifting mechanism at the lowest position is shown that may have a parallelepiped shape, which comprises a top surface, a bottom surface and one or more lateral surfaces. A height h may be less than the length l and/or the width w, as it can be seen in FIG. 3. Other suitable shapes of the autonomous mobile robotic unit 102 are also contemplated, such as but not limited to cylinder, or a cube. The height h of the autonomous mobile robotic unit 102 is such so that the autonomous mobile robotic unit 102 fits under a pedestal of the mini load system 101 or of the inventory carrier 104 and it contains the necessary electronics and a mechanism for lifting and transporting such pedestals. Further, the autonomous mobile robot unit 102 may be wireless and may further contains an integrated rechargeable energy storage component, not shown in figures, for example a rechargeable battery, thus ensuring its fully autonomous operation and free movement within a workplace. Each of the dimensions width w and length l may be in the order of magnitude of 1 m, while the height is in the order of magnitude of 26 cm. However, a person skilled in the art may understand that the dimensions of the autonomous mobile robotic unit 102 may vary depending on factors such as the complexity of the electronics, the dimensions of the CPU and the energy storage and the size of the lifting weight and the relevant center point of gravity of the cargo. The autonomous mobile robotic unit 102 of the specific example can lift a weight of approximately 2 tn, but preferably of about 500 kg.

The energy storage may be replaceable, or it may be of a special type, like (LiFePO4), rechargeable with shorter charging time. In this way the autonomous mobile robotic unit 102 is available to perform at any time and be charged only when it is not involved in any other processes or its battery level is critically low. Also, this type of energy storage offers increased safety because if it is being short circuited it will not produce a flame. The energy storage may also be of a super capacitor type, that is extremely fast recharging when the autonomous robotic unit travels over a proper inductive charging station.

In other examples, when an autonomous mobile robotic unit 102 is not engaged in any process, the autonomous mobile robotic unit 102 moves to a charging station to recharge its energy storage system, if needed.

In other examples, the autonomous mobile robotic unit 102 may have one or more driving wheels, at its bottom surface, for allowing the autonomous mobile robotic unit 102 to move smoothly. In other examples, the autonomous mobile robot unit 102 may also comprise a number of castor wheels to properly support the vehicle. The driving wheels and the castor wheels might also be installed on the chassis of the vehicle in such a way that permits them to accommodate for floor flatness discrepancies, within specific limits. The autonomous mobile robotic unit 102 may have a single wheel at the center of the bottom surface, but a person skilled in the art can understand that such a configuration may cause reduced stability of the system 100, especially when it is loaded. The number of the wheels and their dimensions depend on the weight to be lifted by the autonomous mobile robotic unit 102.

Figure 3:
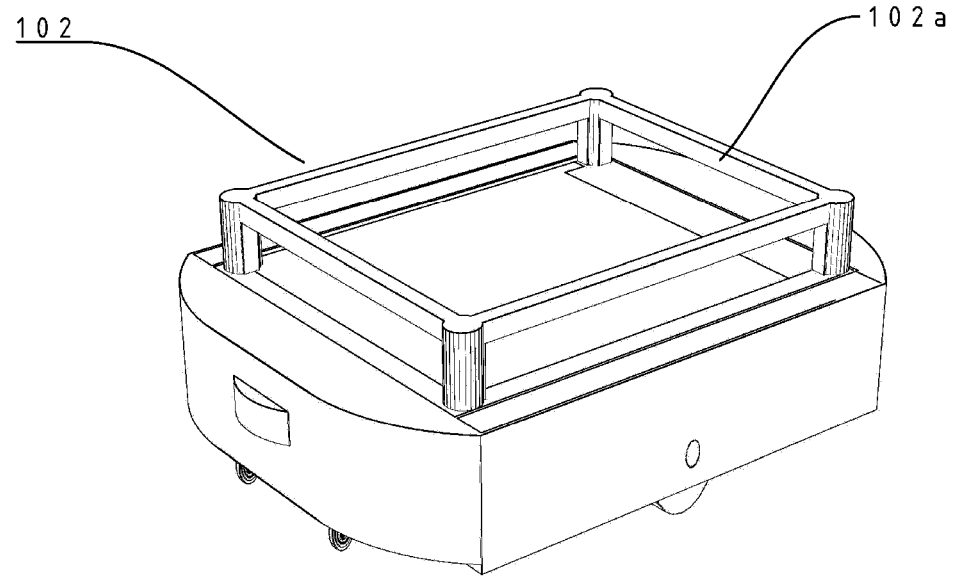
FIG. 3 is a perspective view of an autonomous mobile robotic unit having its lifting mechanism in the high position.
Figure 4:
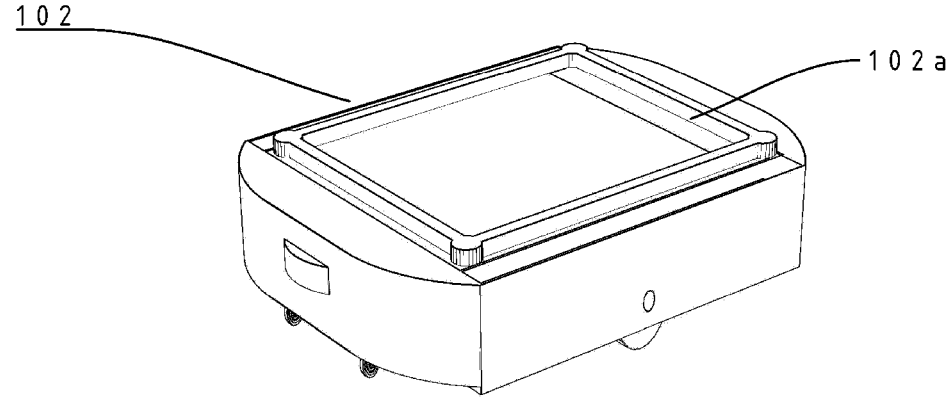
FIG. 4 is a perspective view of an autonomous mobile robotic unit having its lifting mechanism in the low position.

On the top surface the autonomous mobile robotic unit may have the interface of a lifting mechanism 102a as it can be seen in FIGS. 3 and 4 and the energy supply for the system, which is not shown in the figures.

In other examples, the autonomous mobile robot unit 102 may transport the mini load system 101 and the mobile inventory carrier 104 together in any place within a workplace. When a mini load system 101 is brought in the vicinity of a mobile inventory carrier (or the opposite), the autonomous mobile robot unit 102 may move beneath a first pedestal of the mobile inventory carrier 104, lift it and fit it in a secure way on a second pedestal of the mini load system 101 as it can be seen in FIGS. 8, 9 and 10. In that way, the mini load system and the mobile inventory carrier 104 can be moved by an autonomous mobile robotic unit within the workplace.

In another example, the autonomous mobile robotic unit may propel underneath a mobile inventory carrier having a first pedestal, lift it and transport the mobile inventory carrier to any desired location within a workplace. Such location may be also predefined, for example from a specific point A to specific point B.

When a mobile inventory carrier is capable to be transported by an autonomous mobile robot unit and placed on the pedestal of a mini load, such inventory carriers may also be called transportable inventory carriers (104).

According to the disclosure and for clarity purposes, a mobile inventory carrier (107) may be simply capable of being lifted and rotated by the autonomous mobile robotic unit. Such mobile inventory carriers (107) are shown in FIG. 1 and FIG. 11. In other examples, a mobile inventory carrier (104) may be transported to any location within a workplace. Further, such mobile inventory carriers may be placed on a pedestal of a mini load system and therefore they are capable of being transported together with a mini load system by an autonomous mobile robotic unit in any location within a workplace. Such mobile inventory carriers (104) may also be called transportable inventory carriers, as it can be seen in FIGS. 9,10 for example.

That being said, in other examples, the autonomous mobile robot unit 102 may propel underneath a mobile inventory carrier 107, lift it and rotate it so as to bring it in a suitable position preferably next to a mini load 101, where its gripping mechanism can pick a container and place it on another mobile inventory carrier 104, which may be a transportable as defined previously in the current disclosure, as shown in FIG. 12.

In other examples, the autonomous mobile robotic unit 102 may propel underneath the mini load system 101, lift it and transport it in any desired location within a workplace, to carry out any necessary operation. In other examples the autonomous mobile robotic unit 102 may proper underneath the mini load system, while a mobile inventory carrier 104 is placed on the mini load pedestal, raise both the mini load and the mobile inventory container 104, and move them from any point A to any point B within the workplace.

In examples, the pedestals of the mobile inventory carrier 104 and the mini load system 101 respectively may be in the form of a single plate or it may comprise a top surface and a few legs. In a preferred embodiment, the pedestals comprise at least three legs, and most preferably four legs as shown in FIG. 10, to ensure stability of the units while allowing more weight to be added on the mobile inventory carrier 104. However, it must be contemplated that the mini load system 101 and the mobile inventory carrier 104 are also effective even with a single leg.

The pedestals may be made of any known material that can support approximately 300 kg, for example they can be made from metal, like steel or preferably aluminum which is light weighted and is able to bear more weight. It may also be built out of proper synthetic material. Although the pedestal top surface may be of any shape, for example rectangular, square, circle etc., a person skilled in the art understands that, for cost reasons and for enhancement of the transportation of the system, the shape of the pedestals top surface would be beneficial to follow the shape and size of the top surface of the mobile inventory carrier 104 or of the mini load system and of the top surface 202 of the autonomous mobile robotic unit 102. The length of the first and second pedestal may be between 0.8 m and 2 m, preferably between 1 m and 1.5 m, more preferably 1.2 m, and the width of the pedestal may be between 0.8 m and 2 m, preferably between 1 m and 1.5 m, more preferably 1.2 m.

Figure 6:
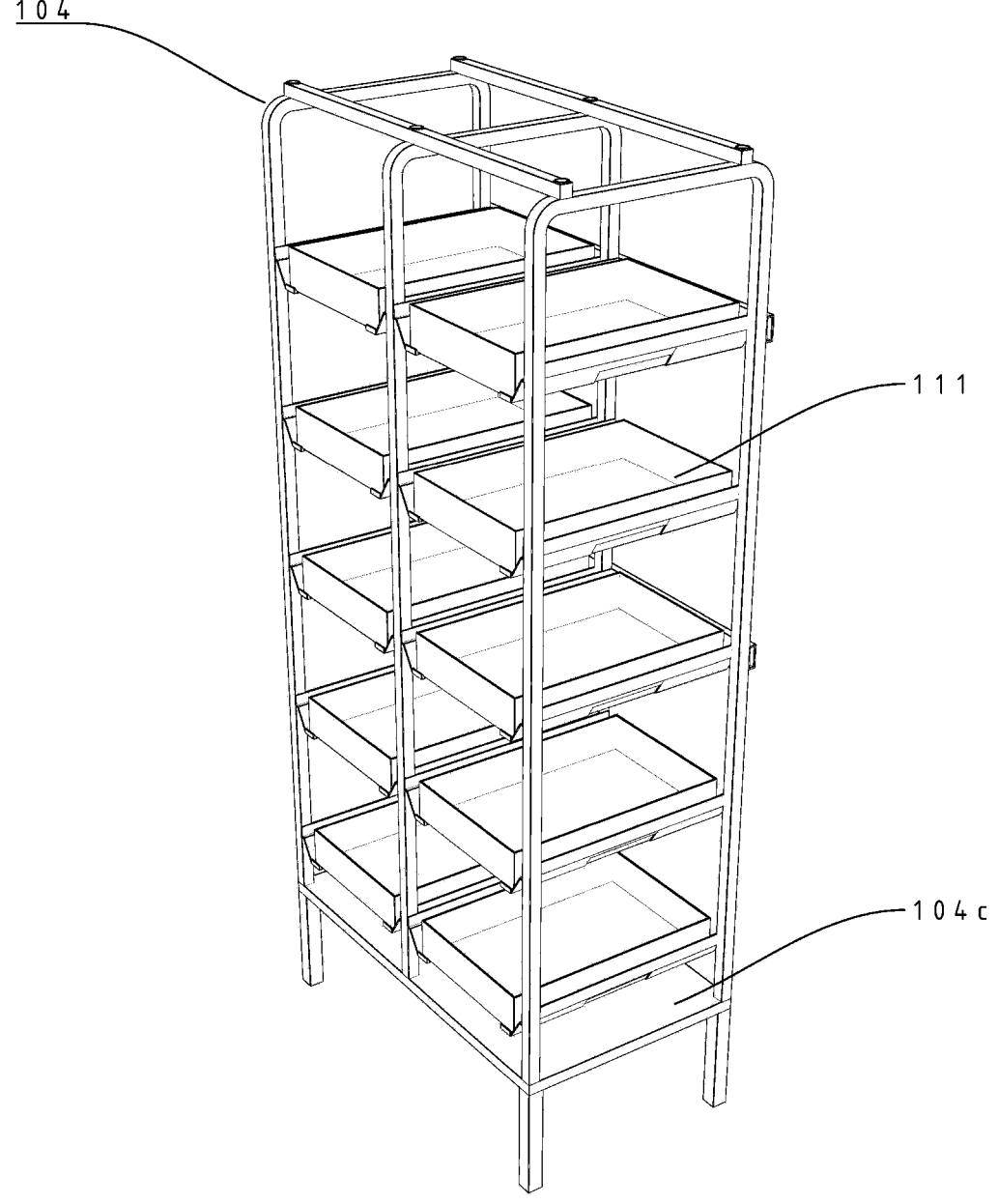
FIG. 6 is a perspective view of a mobile inventory carrier with dekit containers (111).
Figure 7:
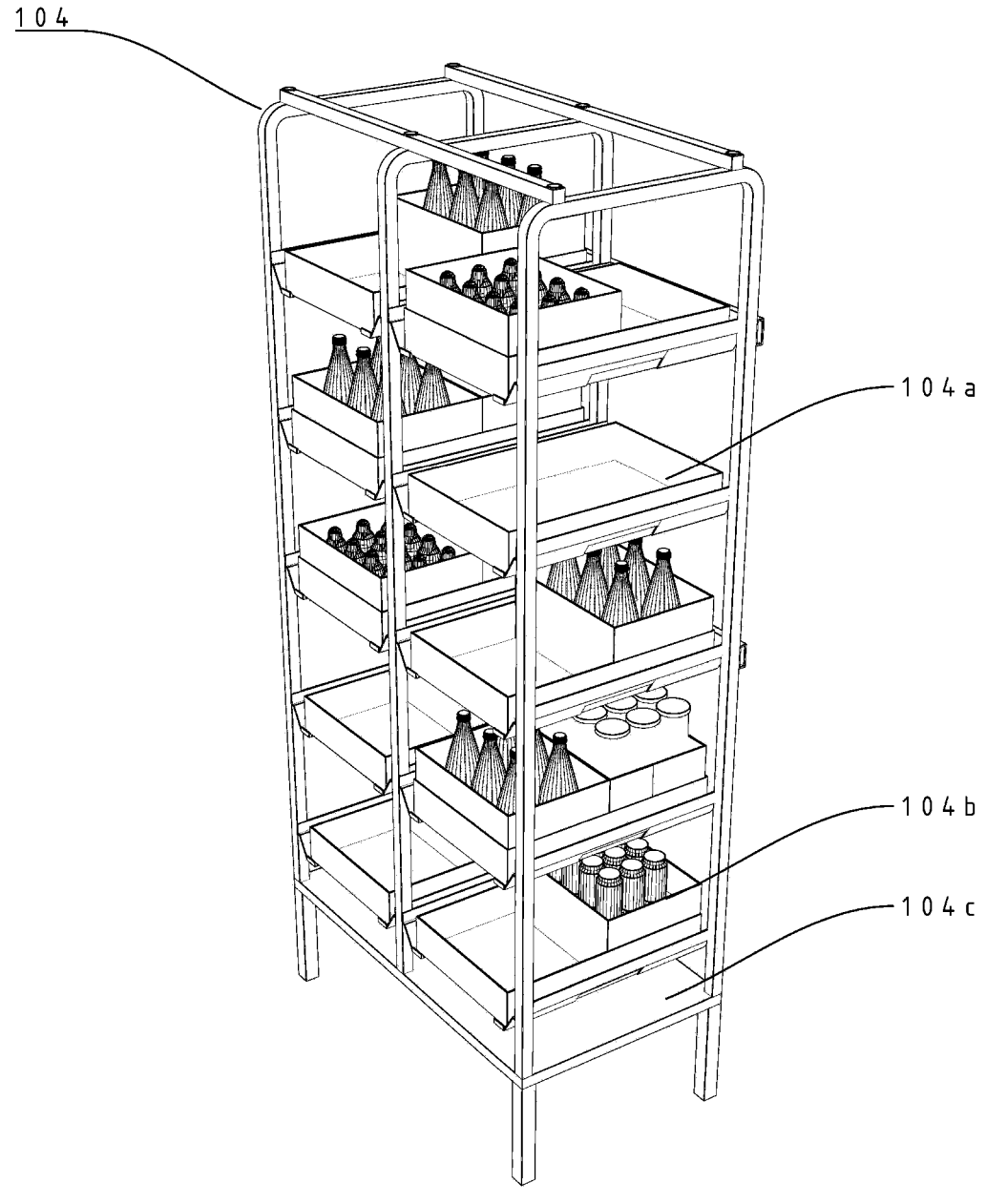
FIG. 7 is a perspective view of a mobile inventory carrier having some empty containers and some containers holding inventory items.

In examples, the mobile inventory carrier comprises a plurality of trays of the same or different dimensions. Depending on the size of each shelf, it supports several containers 111 between 1 and 30, preferably between 5 and 12 in order to increase its efficiency, as it can be seen in FIGS. 5, 6 and 7. In examples, the mobile inventory carrier 104 may stand on a group of legs, at least three legs, preferably at least four for stability reasons. The mobile inventory carrier 104 (FIG. 5) and its shelves may be made of any known material, for example metal, preferably steel, to hold a total approximate weight of 400 kg and not to have a significant weight itself. The mobile inventory carrier 104 may be produced in any possible way, including 3D printing.

Although the mobile inventory carrier 104 may be of any dimensions, a person skilled in the art can understand that the dimensions of the mobile inventory carrier 104 depend on the space available for it to move and the weight it should be able to bear. Also, its dimensions depend on the desirable stability, for example a very high mobile inventory carrier 104 would have a decreased stability.

The mobile inventory carrier 107 is preferably used to store donor containers with inventory. It usually comprises several shelves, its shelf having a number of container storage slots, usually 4 or 6, but may have any number of storage slots depending on the size of the containers (FIG. 11).

Donor containers, as defined in the current disclosure, are the containers holding inventory, while order containers are the containers that are fulfilled at the picking station with items received from donor containers.

Figure 13:
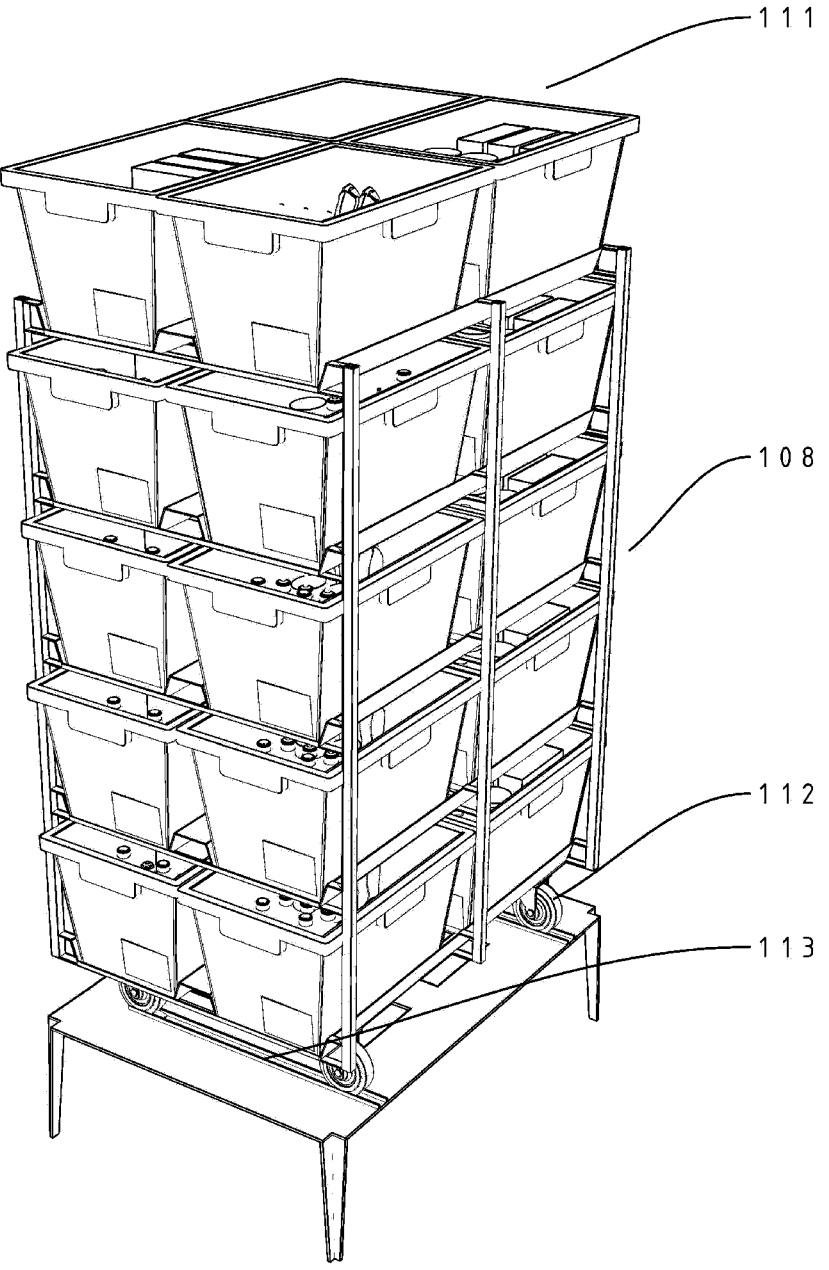
FIG. 13 shows the perspective view of a mobile inventory carrier featuring wheels that are guided and securely fastened into rails that are attached on the top surface of a pedestal.

A mobile inventory carrier (104, 107) may also have wheels 112 (FIG. 13), usually 4 wheels, one for every leg, but it has to be contemplated that it may have any number of wheels. The wheels are guided into proper rails 113, usually two rails, but may have any number of rails, which have a recess at the end, that is able to lock the wheel when it reaches its end position, secure it and prohibit it from moving while being transported. The rails are mounted on the top surface of a pedestal, so an autonomous mobile robotic unit 102 is able to propel underneath it, lift the pedestal with the mobile inventory carrier (104, 107) and move it within the workspace. The wheels serve for rolling the mobile inventory carrier (usually called "roll rack") when it is out of the robotic workplace, so an operator can easily push around the mobile inventory carrier (104, 107) to store it or to loaded onto a transportation vehicle. It has to be noted however, that also the roll racks are capable of being lifted, rotated and/or transported by an autonomous mobile robotic unit, when they are placed on a proper pedestal as shown in FIG. 13.

Each container 111 may be in different forms, for example in the form of a bin (FIG. 13), or a tray (104*a*/FIGS. 6 and 7), a box or a card box.

The mini load system 101 and the autonomous mobile robotic unit 102 are thus totally distinct units, and they operate independently of each other. In that way, any potential failure of any of the other independent units, i.e. the autonomous mobile robotic unit 102 or the mini load system 101, does not limit the ability of the other non-failed unit to continue to operate with another of the units. Also, when an autonomous mobile robotic unit 102 needs to get recharged, this does not limit the ability of the mini load to continue to operate working with another autonomous mobile robotic unit. This ability, which is not disclosed in any of the conventional systems, highly increases the utilization of each of the components of the system, eventually reducing the overall cost of ownership of the system.

The mini load system 101 comprises a gripping mechanism for picking up and releasing containers 111 from a mobile inventory carrier 107 to another mobile inventory carrier 104, which can be also called transportable inventory carrier as defined in the current disclosure.

Figure 2:
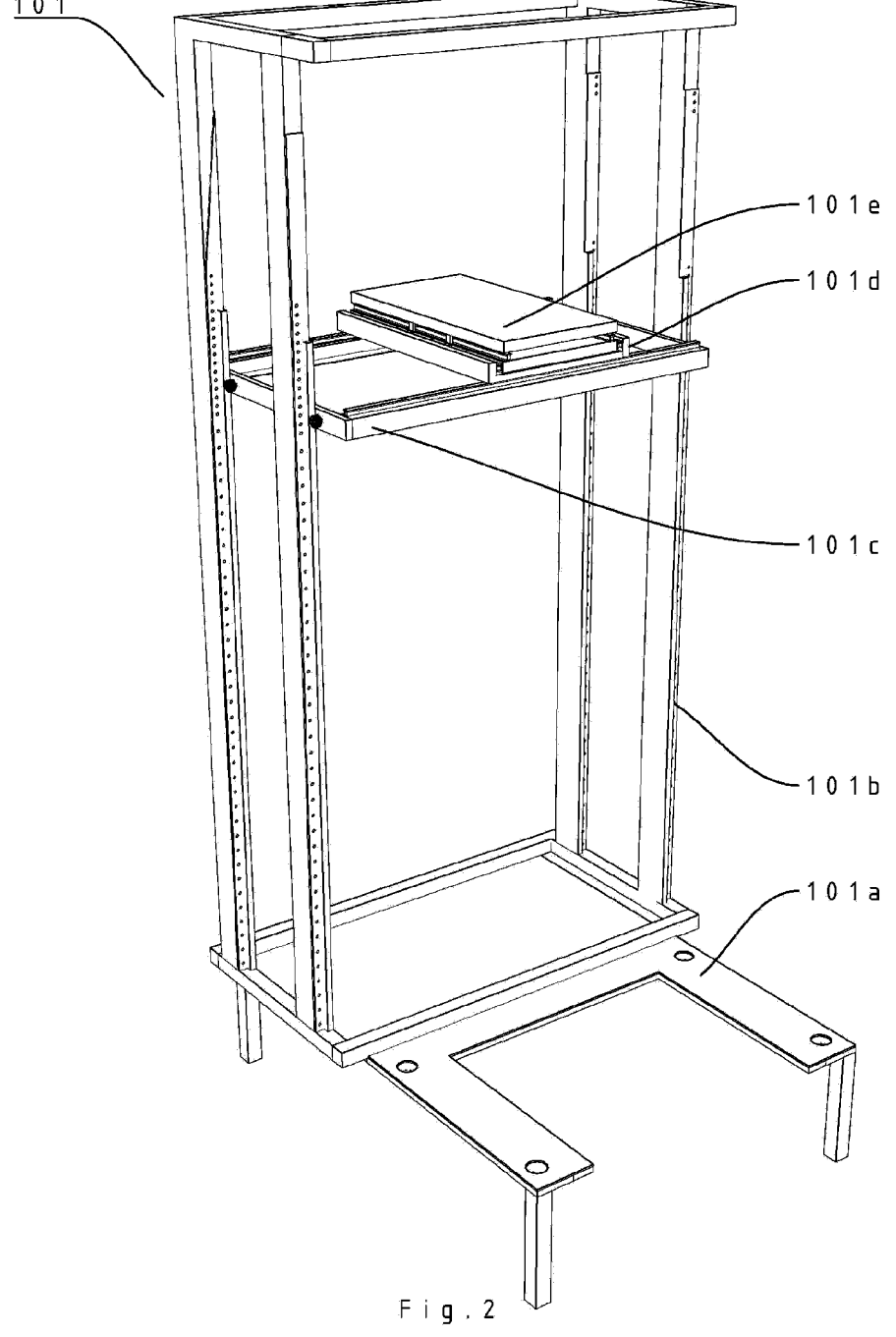
FIG. 2 is a perspective view of a gantry type mini load system

In other examples, the mini load system may be of a Gantry type 101 (FIG. 2), comprising a gantry frame 101*b*, a gantry joint Z 101*c* moving vertically on the Z axes, a gantry joint X 101*d* moving horizontally on the X axes and a container handler 101*e* capable to move in the Y axes as well as to rotate on the XY plane. The gantry frame may be fixedly attached on a pedestal 101*a*, which may have the shape of a plate. The pedestal has several legs, usually four legs, and allow a space underneath the pedestal enough for an autonomous mobile robotic unit 102 to propel and arrive underneath, lift the pedestal with all the mini load and as explained in other examples the mobile inventory carrier 104 (transportable) and move them around within the workplace.

In other aspects the gripping mechanism of the mini load comprises a Visio Servoing system configured to guide the movements of the gantry joints 101*c*, 101*d* and 101*e* to securely handle a container 111. In other examples, the mini load system 101 may further comprise an elongated column that may comprise rails in which the gripping mechanism is allowed to linearly move vertically, either upwards or downwards, depending on the location of the desired container on an inventory carrier. In a further example, the elongated column may be fixedly attached on a pedestal, which may have the shape of a plate. In that way, an autonomous mobile robot unit can go underneath the pedestal and transport the entire mini load system. The pedestal may optionally be coupled to a railed corridor, that consequently allows a horizontal move of the entire mini load system 101, depending on the location of the inventory carriers.

In other examples, the mini load system 101 may be attached on the top surface of the autonomous mobile robotic unit 102. The autonomous mobile robotic unit 102 supplies with energy the mini load system 101 through its energy supply. There is an opening on the top surface of the autonomous mobile robotic unit 102, through which the necessary harness can reach the mini load system 101 and be connected to it. In this way the autonomous mobile robotic unit 102 supplies energy to the mini load system 101 allowing it to reach, load and unload containers 111 to/from the mobile inventory carriers 104. In addition, the autonomous mobile robotic unit 102 can also transport the mini load system 101 around a warehouse and/or a fulfilment center. Although a person skilled in the art may understand that providing energy to the mini load system 101 by the autonomous mobile robotic unit 102 is more ecologically friendly and sustainable, in another example the mini load system 101 may be autonomous and comprise a plug or an energy storage, rechargeable or disposable.

An autonomous mobile robotic unit may, for example, moves beneath the pedestal of a mini load that has an attached mobile inventory carrier (104), lifts the system and moves it next to a mobile inventory carrier 107 to fetch a container stored on it. Due to expected limited linear and angular deviations of the theoretical coarse, the mobile inventory carrier 107 may have a small position fault (usually less than 10 mm lateral and less than 0.5 degrees angular fault), which if not calculated would result to a potential collision of the gripper either with the tray or with the frame of the mobile inventory carrier. To eliminate such unwanted glitches, the gripping mechanism of the mini load system 101 is equipped with a system of cameras and lights that are able to produce a stream video during its move. The stream video is further processed by software means and dictates the gripping means to fetch a target container.

More specifically, the video is continuously analyzed by a bespoke software that is able to understand any lateral or angular misplacement and in a closed loop control to guide the motors controlling the gripper to compensate for any such misplacement correcting the final position of the gripper prior to fetching the container. This system may also be called a "Visio Servoing" system. With the support of the Visio Servoing the necessary precision in the operation of the gripper is achieved in order the system to operate smoothly.

In other examples, the autonomous mobile robot is moving the combined mini load and the mobile inventory carrier (104) next to another mobile inventory carrier (107) where a first donor inventory container is fetched by the mini load gripper and guided by the Visio Servoing system of the gripper is placed with the proper accuracy on a storage spot onto the mobile inventory carrier (104, 107).

The system according to the present disclosure and the appended claims, which comprises at least one mobile inventory carrier, an autonomous mobile robotic unit and a mini load system, all of them independently operating as distinct units, is capable to support all functions involved in fulfilling and delivering online orders as well as all the functions in any distribution center that has to supply with inventory any brick and mortar outlet as stores, convenience stores etc.

Figure 14:
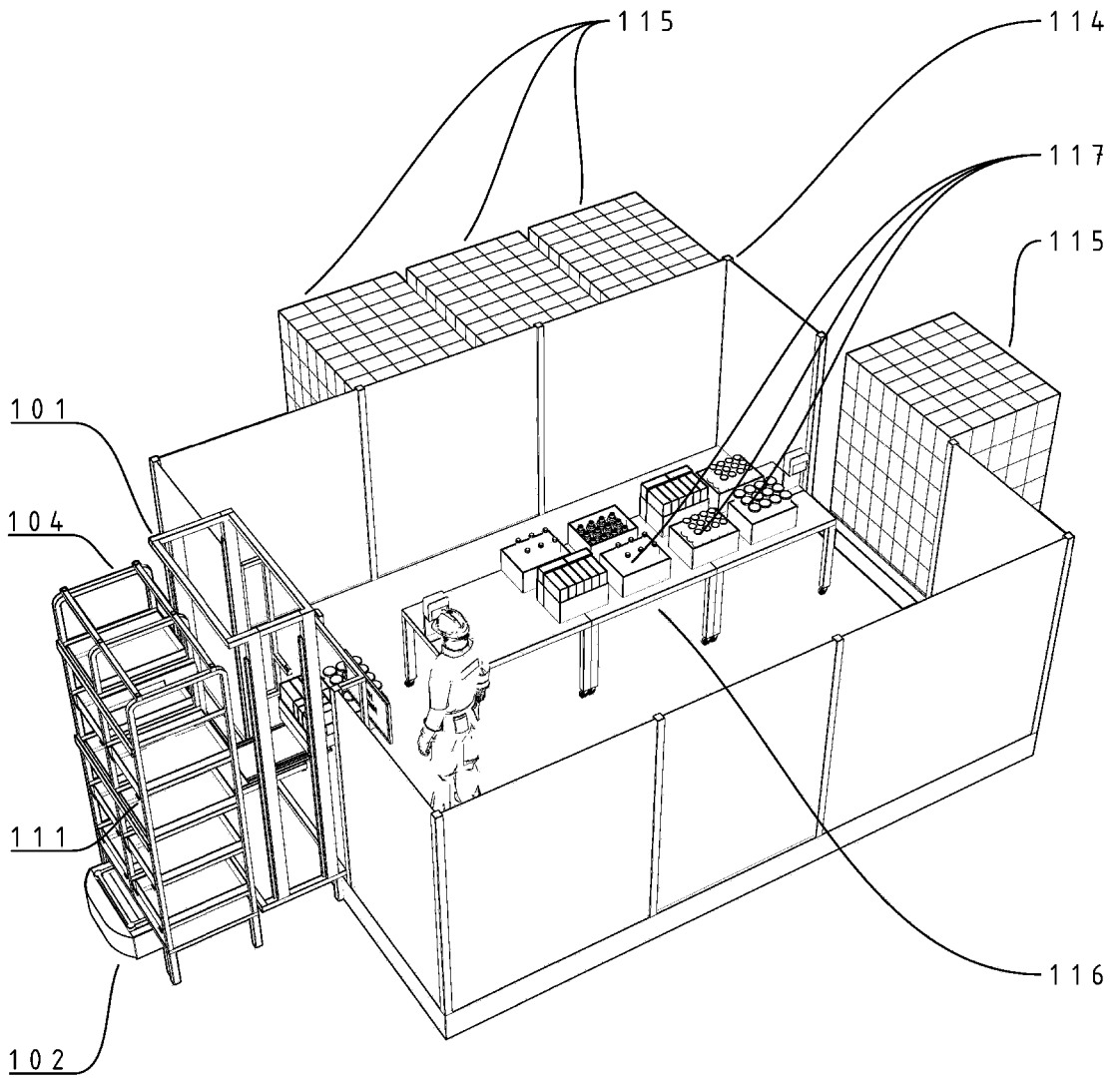
FIG. 14 shows an overview of an inventory receival station where an autonomous mobile robot unit transported a mobile inventory carrier The following description of the examples of the disclosure is made with reference to the accompanying drawings, where the same reference numbers denote identical or similar elements.

In examples, when inventory is received in a warehouse or in a fulfilment center, for example in an inventory receival station 114 (FIG. 14), it is usually packed in containers or boxes stacked in pallets 115 (FIG. 14). To efficiently replenish the inventory into the warehouse, an autonomous mobile robot unit 102 is transporting a mobile inventory carrier 104 with a plurality of empty trays 111 at the inventory receival station 114 (FIG. 14) and places it on the pedestal of the stationary mini load serving the inventory receival station. The mini load system 101 grips an empty tray 111 from the mobile inventory carrier 104 and presents it to the operator who places in the tray 111 the desired inventory. For the easiness of the operation, the boxes 117 with the inbounding inventory from the pallets may already be on a working bench 116, thus making it easier for the operator to place the desired inventory them within a tray (see FIG. 14). The same process is repeated continuously until all trays 111 of the mobile inventory carrier 104 are filled with the desired inventory. When all the trays are filled, the autonomous mobile robot unit transports the mobile inventory carrier 104 to a location close to the inventory storage, where another mini load system 101 is waiting to receive this filled mobile inventory carrier 104 and then propelled by the autonomous mobile robotic unit to store each container 111 on other inventory carriers, such as mobile inventory carriers 107, that are stored in the inventory storage area. In examples, when it is not possible to access a specific storage location at the storage place due to the orientation of the mobile inventory carrier (for example, the slot of the mobile inventory carrier to store the container is not facing the corridor where the mini load stands) then another autonomous mobile robotic unit, moves beneath the mobile inventory carrier, lifts it and rotates it up to 180 deg, thus making the target storage slot of the mobile inventory carrier accessible for the mini load gripper.

In other embodiments, a method for supplying inventory items to a fulfillment station is provided comprising the following steps:
  a) transportation of a first mobile inventory carrier with one or more filled donor containers by a first autonomous mobile robot unit (102) from an inventory area of a fulfilment center to an exchange point,
  b) loading of the one or more containers (111) of the first mobile inventory carrier (104, 107) by a mini load system to a second mobile inventory carrier (104, 107), the second mobile inventory carrier (104, 107) being empty before loading,
  c) repeating steps a and b, until the second mobile inventory carrier (104, 107) is fully loaded with containers
  d) transporting of the fully loaded second mobile inventory carrier (104, 107) by an autonomous mobile robot unit (102) to a picking station of a fulfilment center.
  e) transferring of the second mobile inventory carrier (104, 107) onto the pedestal of a mini load system (101) at the picking station
  f) selection of a first donor container from the second mobile inventory carrier (104, 107) and delivery of the first donor container to an operator
  g) selection by the operator of at least one item from the first donor container and placing of the item into an order container,

13 wherein steps f and g are repeated until the operator has
   selected the items from all the donor containers and
   placed them into the order containers.
   In a further step, an autonomous mobile robotic unit
arrives under the mobile inventory carrier, lifts it from the
pedestal and moves it back to the inventory storage area to
return the donor trays to their original storing slots on the
corresponding mobile inventory carriers.
   Such method ensures fast and precise fulfilment of any
order from a client, while it guarantees that any subsequent
order will be available in reasonable amount of time since all
the components of the system harmonically cooperate to
transport the delivery and inventory carriers to the selected
locations to fill them and deliver the selected goods to the
operators.
   In examples, the system 100 according to the present
disclosure may be used in different locations for the handling
of materials and goods. In a preferred embodiment, the
system is used in a warehouse for fulfilling online orders.
The fulfilment of the orders may take place in a fulfilment
center of the warehouse, comprising the inventory replen-
ishment station, an inventory area, a picking station and a
storage area.
   Such a system can also be used to supply needed inven-
tory to stores, especially convenience stores, that, due to
their very limited storage capacity, it is not possible to store
inventory in pallets or even boxes, containing a unique stock
keeping unit (SKU), and only store inventory in containers
containing several different SKUs.

The invention claimed is:
   1. A system for handling containers comprising:
   at least one mobile inventory carrier for storing contain-
      ers;
   a mini load system including a gripping mechanism for
      picking up or releasing a container from the at least one
      mobile inventory carrier; and
   at least one autonomous mobile robot unit;
   wherein the mini load system, the at least one mobile
      inventory carrier and the at least one autonomous
      mobile robot are distinct units and operate indepen-
      dently from each other, the mini load system including:
   a pedestal, the at least one mobile inventory carrier being
      attached on said pedestal; and
   wherein the at least one autonomous mobile robot unit is
      configured to move together the mini load system and
      the at least one mobile inventory carrier within a
      workplace.
   2. The system according to claim 1, wherein the at least
one autonomous mobile robot unit is configured to transport
the at least one mobile inventory carrier within a workplace.
   3. The system according to claim 1, wherein the at least
one mobile inventory carrier comprises:
   one or more wheels.
   4. The system according to claim 1, wherein the at least
one mobile inventory carrier comprises:
   a pedestal.
   5. The system according to claim 4, wherein the pedestal
comprises:
   rails and one or more wheels coupled to the rails.
   6. The system according to claim 1, wherein the autono-
mous mobile robot unit is wireless and comprises:
   an integrated rechargeable battery.
   7. The system according to claim 6 wherein the battery of
the at least one autonomous mobile robot unit is configured
and arranged to provide power to the mini load system.

8. The system according to claim 1, wherein the at least
one mobile inventory carrier is configured to be freely
mounted in a workplace; and
   wherein the at least one autonomous mobile robot unit is
      configured to lift and/or rotate the mobile inventory
      carrier.
   9. The system according to claim 8, wherein the at least
one mobile inventory carrier comprises:
   one or more wheels.
   10. The system according to claim 9, wherein the mini
load system comprises:
   a gantry system including a frame, a pair of gantry joints
      and a container handler.
   11. The system according to claim 10, wherein the at least
one mobile inventory carrier comprises
   a pedestal.
   12. The system according to claim 11, wherein the autono-
mous mobile robot unit is wireless and comprises:
   an integrated rechargeable battery.
   13. The system according to claim 1, wherein the mini
load system comprises:
   a gantry system including a frame, a pair of gantry joints
      and a container handler.
   14. The system according to claim 13, wherein the frame
is fixedly attached to a pedestal.
   15. The system according to claim 13, wherein the grip-
ping mechanism of the mini load system comprises:
   at least one camera; and
   at least one lighting means.
   16. The system according to claim 15 wherein the grip-
ping mechanism is configured to identify angular and/or
linear deviations of the mobile inventory carrier and thereby
guide movements of the pair of the gantry joints and of the
container handler.
   17. The system according to claim 15 wherein the at least
one camera and the at least one lighting means are config-
ured to generate a stream video that is configured to be
processed by software means and to dictate the gripping
mechanism to fetch a target container.
   18. A method for supplying inventory items to a fulfilment
station, the method comprising:
   a) transporting a first mobile inventory carrier with one or
      more filled donor containers by a first autonomous
      mobile robot unit from an inventory area of a fulfilment
      center to an exchange point;
   b) loading the one or more containers of the first mobile
      inventory carrier by a mini load system to a second
      mobile inventory carrier, the second mobile inventory
      carrier being empty before loading;
   c) repeating steps a) and b), until the second mobile
      inventory carrier is fully loaded with containers;
   d) transporting the fully loaded second mobile inventory
      carrier by an autonomous mobile robot unit to a picking
      station of a fulfilment center;
   e) transferring the second mobile inventory carrier onto a
      pedestal of a mini load system at the picking station;
   f) selecting a first donor container from the second mobile
      inventory carrier and delivery of the first donor con-
      tainer to an operator location; and
   g) selecting at least one item from the first donor container
      and placing of the item into an order container, wherein
      steps f) and g) are repeated until selected items from all
      the donor containers are placed them into the order
      container.
   19. The method according to claim 18, comprising:
   causing an autonomous mobile robot unit to arrive at the
      picking station of a fulfilment center, placing the second mobile inventory carrier on a pedestal of a mini load system and lifting the second mobile inventory carrier via the autonomous mobile robot unit; and returning, via the autonomous mobile robot unit, the second mobile inventory carrier to the inventory area of the fulfilment center, and placing it on a pedestal of a mini load system.

20. The method according to claim 19, comprising:

moving the autonomous mobile robotic unit to a charging station automatically to be recharged, when it is not involved in a process or when the battery is in a low level.

\* \* \* \* \*